US008816863B2

(12) United States Patent
Arman (10) Patent No.: US 8,816,863 B2
(45) Date of Patent: Aug. 26, 2014

(54) METHODS AND SYSTEMS TO DISSUADE ANIMALS FROM AN AREA (75) Inventor: Farshid Arman, Lafayette, CA (US)

(73) Assignee: Siemens Corporation, Iselin, NJ (US)

( * ) Notice: Subject to any disclaimer, the term of this patent is extended or adjusted under 35 U.S.C. 154(b) by 142 days.

(21) Appl. No.: 13/420,977

(22) Filed: Mar. 15, 2012

(65) Prior Publication Data
US 2013/0025544 A1    Jan. 31, 2013

Related U.S. Application Data (60) Provisional application No. 61/492,876, filed on Jun. 3, 2011.

(51) Int. Cl.
*G08B 23/00* (2006.01)
*G08B 13/18* (2006.01)

(52) U.S. Cl.
USPC ............... 340/573.2; 340/573.3; 340/573.1; 340/557; 119/712; 116/22 A (58) Field of Classification Search
USPC .......... 340/573.2, 573.3, 573.1, 573.4, 340/555–557, 540, 500, 693.5, 384.2; 250/339.14; 43/3, 124, 132.1; 119/712, 119/713; 116/22 A
See application file for complete search history.

(56) References Cited

U.S. PATENT DOCUMENTS

| 5,969,593 | A  | * | 10/1999 | Will | 340/384.2 |
| 6,575,597 | B1 | * | 6/2003  | Cramer et al. | 362/259 |
| 6,718,681 | B2 | * | 4/2004  | Bhullar | 43/1 |
| 2007/0205904 | A1 | * | 9/2007 | Froehner | 340/573.2 |
| 2008/0123167 | A1 | * | 5/2008 | Weiss et al. | 359/198 |

OTHER PUBLICATIONS

Laser—Avian Dissuader & Bird Phazer pp. 1-11, dated Dec. 8, 2011.

* cited by examiner

*Primary Examiner* — Anh V La (57) ABSTRACT

Systems and methods for generating a laser beam illuminating a space around an object are provided. The laser beam illuminates an animal that is approaching the object in the space. The laser beam is generated by a laser illuminating at least a first micro-mirror that moves under control of a processor. Additional micro-mirrors are contemplated. The laser beam reflected from the moving micro-mirror illuminates the space around the object. Laser, processor and micro-mirrors are dimensioned to illuminate with a high probability an area with a cross-section perpendicular to a laser beam of 10 cm by 10 cm inside the space at a distance of up to 200 meters from the laser or farther.

19 Claims, 12 Drawing Sheets

Divide the 200 meter hemisphere into 4 quadrants. Each of the four quadrants is covered by one laser setup.

Electronics can control time spent at each region of the sky. Can also control laser intensity.

METHODS AND SYSTEMS TO DISSUADE ANIMALS FROM AN AREA

STATEMENT OF RELATED CASES

This application claims the benefit of U.S. Provisional Application Ser. No. 61/492,876 filed Jun. 3, 2010, which is incorporated herein by reference.

BACKGROUND OF THE INVENTION

The present invention relates generally to alert animals about an object or an area and more specifically to dissuade animals from continuing a path of approach to the object or the area.

Certain objects such as large-scale wind turbines are dangerous to animals. For instance a wind turbine in a flight path of birds and bats is dangerous. Birds are killed when they collide with the wind blades (even stationary wind blades), cellular towers, transmission towers, and transmission lines; furthermore, bats are killed when their lungs are damaged in the turbulence caused by the blades. Dolphins can be hurt by rotating propellers of ships, birds can cause damage to water drinking supplies in reservoirs, hunt fish in fish farms, and be nuisance to areas such as yacht clubs, wineries, and even landfills.

Accordingly, novel and improved methods and systems to dissuade animals from approaching a region are required.

BRIEF SUMMARY OF THE INVENTION

Aspects of the present invention provide systems and methods to dissuade animals such as birds or bats from approaching a region or an object in a region.

In accordance with an aspect of the present invention, a method is provided for dissuading an animal inside a volume from approaching an area inside the volume, comprising a light pattern generated by a laser to illuminate the volume around the area, wherein the laser illuminates a first micro-mirror moveable about two axes controlled by a processor to generate a first pattern of laser light, wherein the laser light illuminates the volume with a predefined probability.

In accordance with a further aspect of the present invention, a method is provided, wherein the volume is characterized by a sphere wherein the laser is part of a system of seven lasers which concurrently illuminate different parts of the sphere.

In accordance with yet a further aspect of the present invention, a method is provided, further comprising the first pattern of laser light illuminating a second micro-minor controlled by the processor to generate a second pattern of laser light.

In accordance with yet a further aspect of the present invention, a method is provided, wherein the laser is a green light laser.

In accordance with yet a further aspect of the present invention, a method is provided, wherein the animal is a bird.

In accordance with yet a further aspect of the present invention, a method is provided, wherein the animal is a bat.

In accordance with yet a further aspect of the present invention, a method is provided, wherein the area contains a wind turbine.

In accordance with yet a further aspect of the present invention, a method is provided, further comprising illuminating the volume through a lens.

In accordance with yet a further aspect of the present invention, a method is provided, wherein an object with a cross-section perpendicular to a laser beam of at least 10 cm by 10 cm has a probability to be illuminated by the laser beam once every one second that is better than 90% at a distance of 200 meters of the laser.

In accordance with yet a further aspect of the present invention, a method is provided, wherein the volume is determined by a part of a sphere with a center located at a housing containing the laser and a differential azimuth angle of at least 45 degrees and a differential inclination angle of at least 45 degrees.

In accordance with another aspect of the present invention, a system is provided to dissuade an animal inside a space from approaching a region inside the space, comprising a laser to generate a laser beam, a processor to control a movement of a first micro-mirror pivotable about a first and a second axis, wherein the first micro-mirror is enabled to receive and reflect the laser beam and to generate a control signal to create a movement of the first micro-mirror to reflect the laser beam in a first pattern to illuminate the space with a predefined probability.

In accordance with yet another aspect of the present invention, a system is provided, further comprising at least 6 additional lasers, each additional laser illuminating a corresponding micro-mirror, all lasers and micro-minors integrated in a single housing and enabled to substantially illuminate a hemisphere around the system.

In accordance with yet another aspect of the present invention, a system is provided, further comprising a second micro-mirror, movable about two axes and controlled by the processor and enabled to receive and to reflect the laser beam from the first micro-mirror to generate a second pattern.

In accordance with yet another aspect of the present invention, a system is provided, wherein the laser generates light in a wavelength range of 500 nm to 550 nm.

In accordance with yet another aspect of the present invention, a system is provided, wherein the animal is a bird.

In accordance with yet another aspect of the present invention, a system is provided, wherein the animal is a bat.

In accordance with yet another aspect of the present invention a system, is provided, wherein the region contains a wind turbine.

In accordance with yet another aspect of the present invention, a system is provided, wherein the region contains is a transmission tower.

In accordance with yet another aspect of the present invention, a system is provided, wherein the laser is located at an airport.

In accordance with yet another aspect of the present invention, a system is provided, wherein the first micro-mirror moves with a frequency of 5000 Hz or more.

DETAILED DESCRIPTION

As an aspect of the present invention, a laser is provided that generates a laser beam of low power and one or more micro-mirrors to create a dazzling pattern covering a large volume or space of "No Fly Zone." In one embodiment of the present invention the "No Fly Zone" is at least part of a sphere that has a radius of less than 5 meters. In one embodiment of the present invention the "No Fly Zone" is at least part of a sphere that has a radius of less than 200 meters but greater than 5 meters. In one embodiment of the present invention the "No Fly Zone" is at least part of a sphere that has a radius of greater than 200 meters.

While birds and bats are used as exemplary animals that are in flight, it should be clear that aspects of the present invention also apply to other animals, including swimming animals and animals that move on the ground.

Birds and bats entering the No Fly Zone encounter the dazzle pattern with an ever-increasing intensity and frequency as they get closer to the center of the no fly zone. The laser beam is reflected on a first micro-mirror which is capable of very high frequency adjustments about its own x and y axis. The combination of the laser and x-y motion is able to create a multitude of patterns (such as lissajous, raster, or random) which is called a dazzle pattern. Accordingly, the dazzle pattern is created by a processor which affects movement of the micro-mirror in such a way that the beam projected from the micro-mirror on a surface will show the dazzle pattern. When the laser is directed at or close to a neutral rotation point of the mirror this dazzle pattern in a projection to the outside world moves relative to a stationary neutral projection point.

Optionally, the dazzle pattern is reflected from the first mirror onto a second micro-mirror (larger mirror size but lower rate of movement) movable in x and y direction controlled by a processor. By projecting the dazzle pattern off-hinge-center of the second micro-mirror a sweep pattern is created which defines which part of the volume or space is illuminated by the dazzle pattern. Depending on the angle of movement of the second and larger mirror, a portion of the No Fly Zone sphere is exposed to the dazzle pattern. By combining several such set of lasers, the necessary optic elements, and micro-mirrors and entire at least partial sphere or illuminated volume or space of No Fly Zone is created.

It is believed that there currently are no systems to effectively dissuade bats automatically with an at least one micro-mirror based laser system. The most prominent approach of using sonar fails since the distance traveled by the sonar falls short of required safety range. Worse yet, the distance traveled by the sonar is affected by the humidity in the atmosphere. Birds, on the other hand, are often dissuaded by loud noise. However, this cannot be precisely directed or contained, disrupts other animals also, wakes sleeping birds which worsens the problem and it negatively affects the human population nearby.

Figure 1:
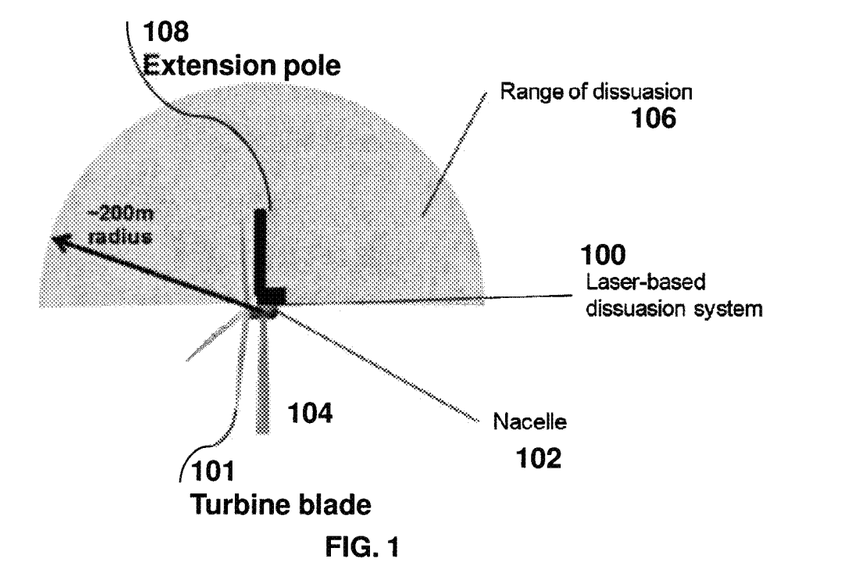
FIG. 1 illustrates a system provided in accordance with various aspects of the present invention.
Figure 5:
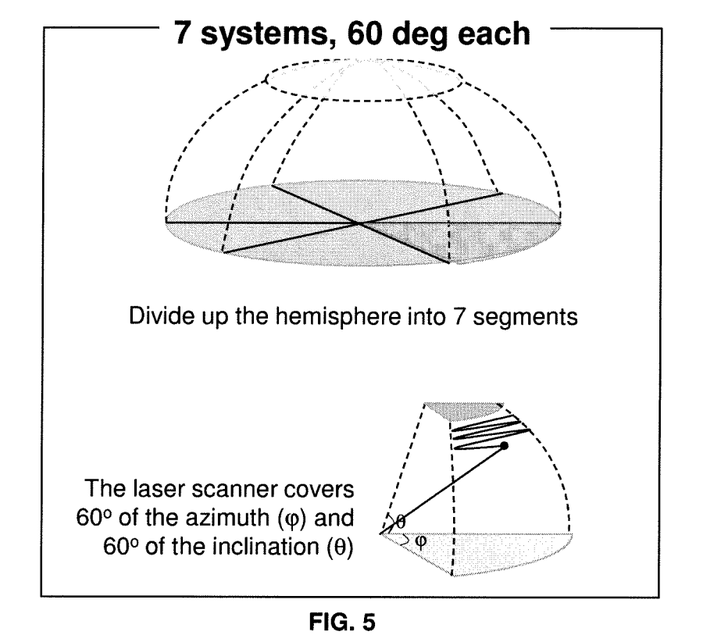
FIGS. 5 and 6 illustrate different ways to illuminate a hemisphere in accordance with an aspect of the present invention.

Systems as provided herein are capable of covering relatively long ranges (limited by the power of the laser) so that fast flying birds (some fly at 20 meters per second) and bats get ample warning. A system does not affect the non-flying species as the laser light in a preferred configuration of the system does not illuminate the ground area. In order to keep the system safe for pilots of airplanes, in one embodiment of the present invention a defocusing lens is applied to diverge the laser beam beyond a pre-defined distance (for example beyond 500 m). The system is not affected by weather. The figures described below illustrate aspects of the invention. It is assumed that in one embodiment of the present invention, the No Fly Zone is a hemisphere divided into 4 quadrants. This is illustrated in FIGS. 1 and 5. FIG. 1 illustrates an overview diagram wherein a laser based dissuasion system 100 is placed on a nacelle 102 of a wind turbine 104. The range of dissuasion 106 is a hemisphere or a semi hemisphere divided into 4 quads which is further illustrated in FIG. 5, each covered by its individual system. The number of systems required to cover a hemisphere depend on several factors, including the scanning angle of the micro minor and the scan speed of the minor and can be as many as 13 or more, as required by circumstances A laser can project a pattern on a surface. However, the ultimate purpose here is not to create an image on a surface. One purpose, in accordance with an aspect of the present invention is to illuminate a volume in such a manner that it will have a high probability to illuminate an animal inside the volume within a certain period. An animal at the periphery of the volume relative to the mirrors will have the lowest probability to be illuminated. One preferred probability of illumination of an animal at the periphery of a volume is for instance a probability of 90% for the animal with a cross-section of about 10 cm by 10 cm to be illuminated at least once every 5 seconds at a distance of 200 meters. A more preferred probability of illumination of an animal with a cross-section of about 10 cm by 10 cm inside a volume is for instance a probability of 99% for the animal to be illuminated at least once every second at a distance of 200 meters. It is preferable to use an illumination space that has a higher probability of illuminating an animal with a cross-section of about 10 cm by 10 cm at 200 meter if that animal is expected to fly at a high speed. In that case one may want to apply a fairly narrow space of illumination wherein the probability of illuminating a fast flying bird is high or to increase the number of units.

It may in some cases not be feasible to cover a very large volume, for instance due to the limitations of the micro-mirrors. For instance, a wind turbine with blades of 50 meters, require quite a large angle of operation of the sweep micro-mirror. If the laser system is placed on the nacelle of the turbine and the operational vertical angle is 90 degrees (+ and −45 degrees relative to the axis of rotation of the turbine) the bird will fly out of the illumination space about 50 meters from reaching the top reach of the turbines blades. This issue can be addressed by widening the vertical operational angle of the illumination system.

In one embodiment of the present invention, the illumination system is placed on an extension pole 108. Depending on the length of the extension pole, the vertical operational angle can be limited. The extension pole may require significant redesign of the nacelle or other parts of the turbine to which it is attached. In accordance with a further embodiment of the present invention, an illumination system as provided herein is placed inside or on a blade 101 of a wind turbine.

In one embodiment of the present invention an illumination system is placed on a carrier in or adjacent to a protected area. In one embodiment a carrier is a pole. In one embodiment a carrier is a tripod or any other construction that can hold an illumination system. In one embodiment of the present invention an area or region is protected by an illumination system of multiple illumination units placed on a perimeter of a protected area. For instance, multiple illumination units may be placed on poles or tripods on the perimeter of a wind farm.

Micro-mirror chips are known and are marketed by different companies. These chips are generally available as Micro-electro-mechanical systems (MEMS) chips and are well known in the industry. The frequency of a mirror is defined by the time it takes to move between defined positions of the mirror. A micro-mirror can be moved in x and y direction by applying one or more signals controlled for instance by a processor. The movement of a micro-mirror can for instance be characterized by two rotational axes about which the mirror pivots. There are different mirror technologies and control technologies available, as is known to one skilled in the art of micro-mirrors. Accordingly, the mirrors and thus the generated illumination pattern and/or the volume of illumination as well as the power of the light source, which is preferably a laser, is controlled in accordance with an aspect of the present invention by a processor. Software on the processor can adjust the frequency of mirror movement, with the effect being that the slower refresh rates increase the power of the laser—the same laser power is spread more slowly.

There are different types of micro-mirrors, including resonant and non-resonant, gimballed, hinged, gimbal-less, torsional, cantilevered or any other micro-minor that is useful in enabling the systems as provided herein. Selection of a type of micro-mirror depends on the requirements of a system, including price, speed and required volume coverage. Coverage of a substantial area up to a distance of 200 meters from the system with a sufficient probability to illuminate an approaching animal within the area, by applying currently available micro-minors, control processors, proper optics, and lasers is within the capabilities of current components.

Figure 2:
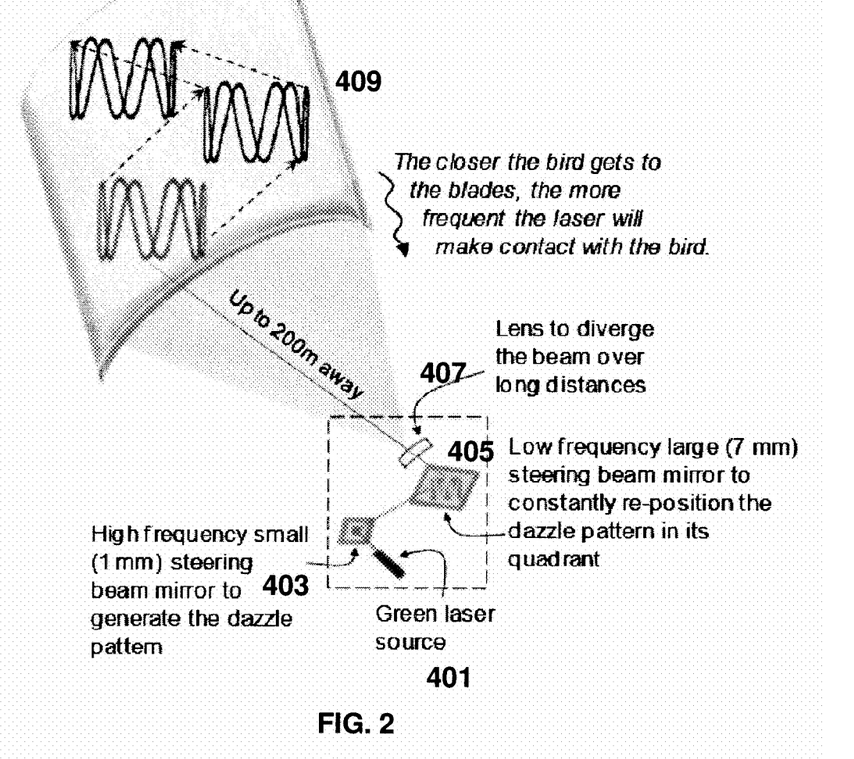
FIG. 2 illustrate a system as provided in accordance with various aspects of the present invention.

One illustrative example of a bird dissuading system is illustrated in FIG. 2. The system has a light source 401, which is preferably a green laser with adjustable optical power, or generating light in a wavelength range of 500-550 nm. The source 401 illuminates a first micro-minor 403, which is moved at a relatively high frequency such as preferably 1000 Hz or higher, or more preferably 5000 Hz or higher or most preferably 10,000 Hz or higher and has a movable mirror with a diameter that may be 1 mm or larger. The mirror is moved by a processor to create a dazzling pattern of laser radiation. The dazzling laser beam from micro-mirror 403 illuminates an optional second mirror 405 (the sweeping pattern mirror) with a larger mirror surface and which is moved to steer the dazzle pattern into the portion of the sky that is covered by the system. In one embodiment of the present invention, the mirror 405 moves at a lower frequency that minor 403, for instance at a frequency of about 100 Hz or higher, or a frequency of about 400 Hz or higher. In a further embodiment of the present invention, the movement of mirror 407 has a much higher frequency, for instance 5000 Hz.

In one embodiment of the present invention, the speed of the micro-minors is such that a bird flying at 200 meters from the system would experience a sufficient exposure to laser light to become aware of the laser. As the bird (or bat) flies towards the system the time of exposure to laser light will increase and will increasingly scare the animal away.

A lens 407 to diverge the beam over long distances is also provided. Image 409 illustrates the displayed pattern in a segment of the sky as generated by the system.

Figure 3:
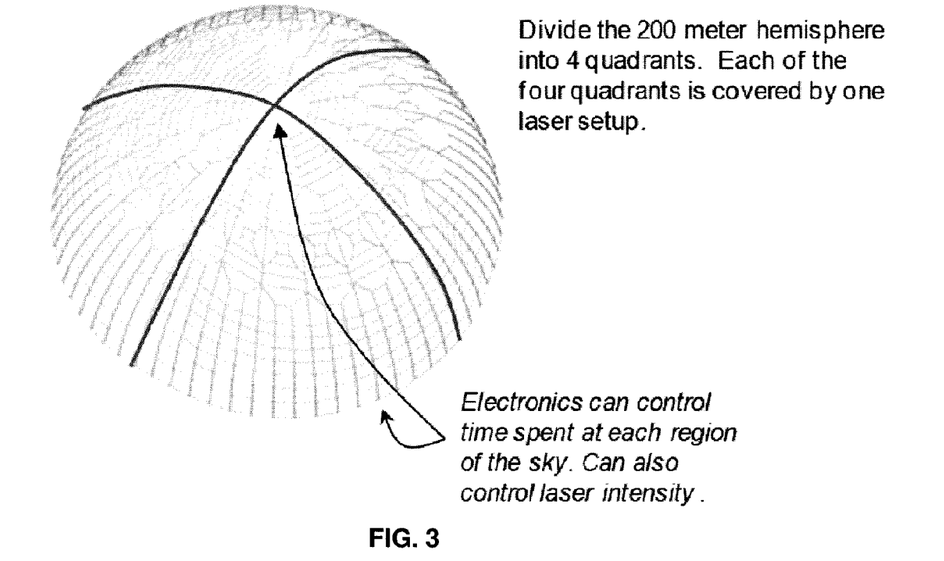
FIGS. 3 and 4 illustrate a space illuminated in accordance with various aspects of the present invention.

FIG. 3 illustrates the sky hemisphere segmented in 4 segments, wherein each quadrant has its own system. The division in quadrants depend upon the coverage, (including radius, and angle of the section) and the repeat time of the beam in a segment. It is related to the speed of the mirrors and the angle between which the mirrors can be moved. At a very high speed and a large angle of a micro-mirror, a system may for instance cover 2 quadrants.

Where a beam is located in a quadrant or section is controlled by the system. For instance, a system may be programmed to provide better coverage at lower angles than at higher angles, if one assumes that at angles close to 90 degrees (straight up) the system probably will not significantly influence the flight path of a bird, but may be able to do so at relatively low angles (15 degrees to 70 degrees for instance) when a flying bird is approaching a turbine at lower altitudes.

In one embodiment of the present invention, the system is enabled to illuminate substantially a section of a hemisphere. In a further embodiment of the present invention, the system generates a beam that spends about 50% or more of its active time in a predetermined part of the section of the hemisphere. In yet a further embodiment of the present invention, the system generates a beam that spends about 90% or more of its active time in a predetermined part of the section of the hemisphere. In yet a further embodiment of the present invention, the system generates a beam that spends about 50% or less of its active time in a predetermined part of the section of the hemisphere. In yet a further embodiment of the present invention, the system generates a beam that spends about 10% or less of its active time in a predetermined part of the section of the hemisphere.

Figure 4:
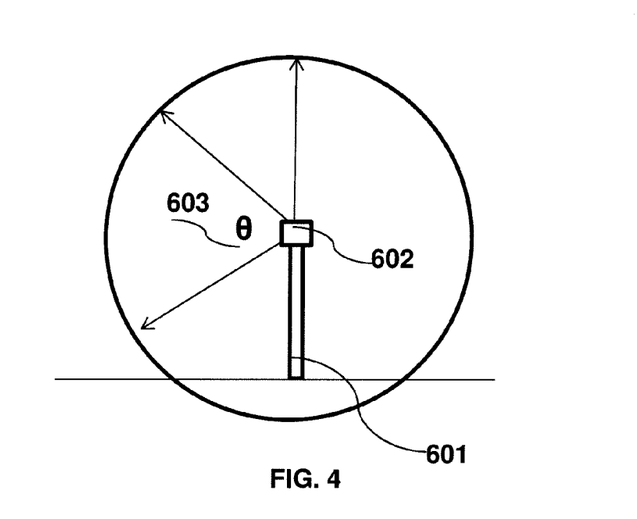

FIG. 4 illustrates an angle θ (603) defines a limited section of a laser system 602 on top of a turbine 601 which is able to cover a vertical range of 180 degrees. In one embodiment of the present invention a predetermined part of a segment is defined by a vertical angle of 90 degrees or less. In one embodiment of the present invention a predetermined part of a segment is defined by a vertical angle of 60 degrees or less. One can impose similar limitation upon the horizontal reach and coverage of the system.

In one embodiment of the present invention, at least part of the section of the hemisphere is illuminated uniformly. In that case an animal anywhere in that section at a predefined distance from the laser has a uniform change or a substantially uniform change to be illuminated by the laser.

In one embodiment of the present invention, the system is dimensioned in such a way that an animal moving at a predefined distance towards the object (the turbine) and the system within a predefined segment of the volume covered by the system has a better than 50% change to be illuminated by the system. For instance, one can set the micro-mirrors in such a way that a bird with a cross-section of about 10 cm by 10 cm flying at a 200 meter distance from the turbine within a virtual cone with a top angle of 60 degrees with the top of the cone at the top of the turbine or the illumination system has a better than 80% probability to be illuminated at least once by the laser in a period of 5 seconds. The probability increases dramatically as the bird gets closer to the system. In one embodiment of the present invention, a bird with a cross-section of about 10 cm by 10 cm flying at a 200 meter distance from the turbine within a virtual cone with a top angle of 30 degrees with the top of the cone at the top of the turbine or the illumination unit has a better than 90% probability to be illuminated at least once by the laser in a period of 1 second.

The areas mentioned herein in an illuminated space by a laser are areas that are orthogonal or perpendicular to the laser beam. These areas will be called perpendicular areas or areas with a perpendicular cross section or a cross section perpendicular to a laser beam.

In one embodiment of the present invention, an illumination unit is placed on a pole or a tripod to illuminate a volume. In one embodiment of the present invention the system is dimensioned in such a way that an object with a cross-section perpendicular to the laser beam of about 10 cm by 10 cm moving at a predefined distance towards the illumination unit within a predefined segment of the volume covered by the system has a better than 50% change to be illuminated by the system. For instance, one can set the micro-mirrors in such a way that a bird with cross-section perpendicular to the laser beam of about 10 cm by 10 cm flying at a 200 meter distance from the unit within a virtual cone with a top angle of 60 degrees with the top of the cone at the top of the unit has a better than 80% probability to be illuminated at least once by the laser in a period of 5 seconds. The probability increases dramatically as the bird gets closer to the system. In one embodiment of the present invention, a bird with cross-section perpendicular to the laser beam of about 10 cm by 10 cm flying at a 200 meter distance from the unit within a virtual cone with a top angle of 30 degrees with the top of the cone at the top of the unit has a better than 90% probability to be illuminated at least once by the laser in a period of 1 second.

In one embodiment of the present invention, an animal with cross-section perpendicular to the laser beam of about 10 cm by 10 cm within the illumination volume of an illumination unit has a probability to be illuminated by the laser in an illumination unit every one second that is better than 90% at a distance of 200 meters of the unit. In one embodiment of the present invention, an animal with cross-section perpendicular to the laser beam of about 10 cm by 10 cm within the illumination volume of an illumination unit has a probability to be illuminated by the laser in an illumination unit twice every one second that is better than 90% at a distance of 200 meters of the unit.

One can thus program a processor that controls the laser and the mirrors to effect a pattern that covers a preferred section with a preferred pattern and preferred intensity and a preferred repeat time.

Lasers operated in the green part of the visible spectrum are one preferred type of lasers that is used as a light source in a system as provided herein. However, the system is not limited to green light lasers. Other wavelength lasers are also contemplated to be used in accordance with various aspects of the present invention. Many birds are sensitive and can see light in the ultra-violet (UV) part of the spectrum. Birds and other animals may be sensitive to other wavelengths. For instance some nocturnal and deep sea animals are sensitive and can see infrared (IR) light. Thus, in accordance with an aspect of the present invention a light source can be used in a dissuasion system that uses a light source that emits light in any useful part of the light-spectrum, ranging from UV to IR.

A system may be a portable system that can be used for different locations, different situations and for dissuasion of different animals. In one embodiment of the present invention the system has at least two different light sources, of which at least one is selected in a programmable way to be the active light source during operation. In one embodiment of the present invention, at least two light sources are operational at the same time in a single system. For instance, a system at night may illuminate an area with visible light and with UV light. Or with visible light and IR light.

Figure 6:
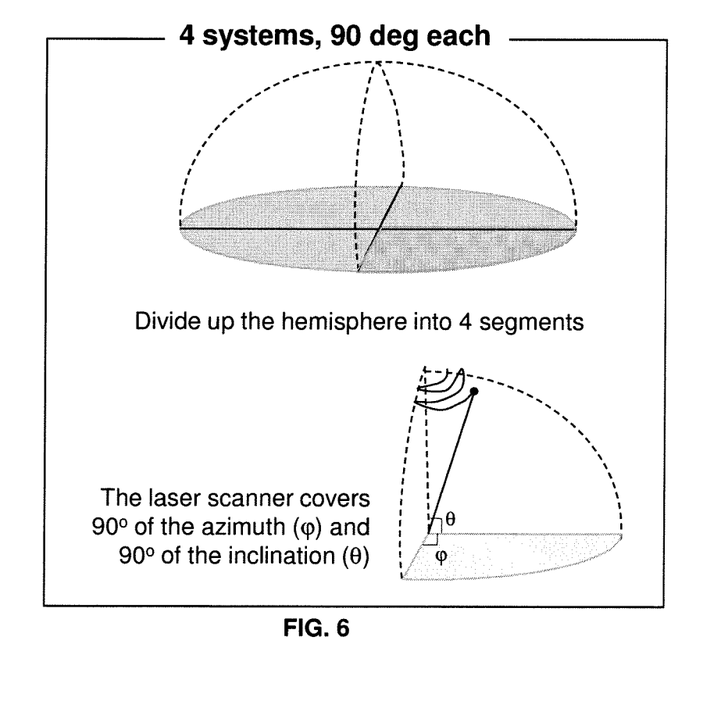

FIG. 5 provides a diagram that illustrates dividing a hemisphere into 7 segments of which each is covered by an individual laser system. FIG. 6 provides a diagram that illustrates dividing a hemisphere into 4 segments with each segment being covered by an individual system.

Figure 7:
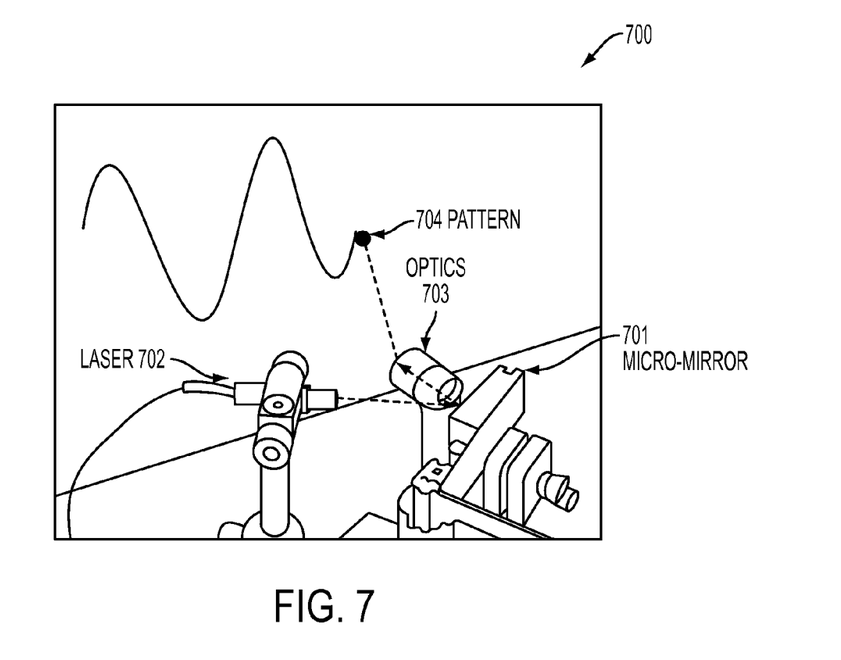
FIG. 7 illustrate a set-up of a system in accordance with an aspect of the present invention.

FIG. 7 is a diagram that illustrates a single mirror system 700 using a laser source 702, a single micro-mirror 701 controlled by a processor and optics 703 to process the reflected beam and the resulting pattern 704. Design considerations for a laser scanner system as illustrated in FIG. 7 include: the tip/tilt angle of the micro-mirror; the role of optics, such as magnification, focal point and attenuation; and the speed of scanning vs. mirror size.

Figure 8:
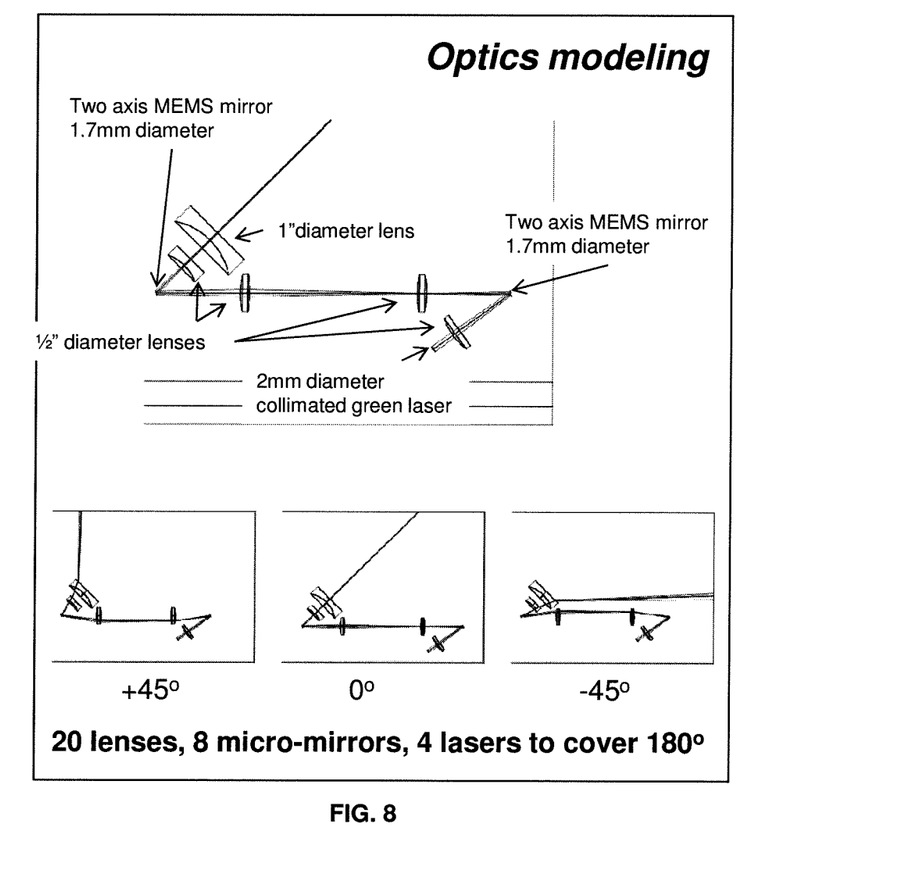
FIGS. 8 and 9 illustrate different optical models in accordance with various aspects of the present invention.

FIG. 8 illustrates the optics modeling for covering a quad hemisphere as illustrated in FIG. 6. A single system to cover a quad of a hemisphere in one embodiment of the present invention applies one 2 mm collimated green light laser, two two-axis MEMS mirrors of 1.7 mm, and 5 lenses. To cover the complete hemisphere, 4 lasers, 8 micro-mirrors and 20 lenses are required. In one embodiment of the present invention the 4 systems are embodied in a single housing.

A micro-mirror herein is assumed to have a reflective area that is relatively small, contained in a housing, attached and movable rapidly about at least one axis and preferably about at least two axes and controlled by a signal. In accordance with an aspect of the present invention a micro-mirror can be moved with a maximum frequency of preferably higher than 100 Hz, more preferably higher than 1000 Hz, and most preferably with a maximum frequency of 10 kHz or higher. The reflective area of a micro-mirror may be equivalent to a circle with a diameter of about 2 cm or less, or to a circle with a diameter of about 1 cm or less, or to a circle with a diameter of about 1 mm or less.

Figure 9:
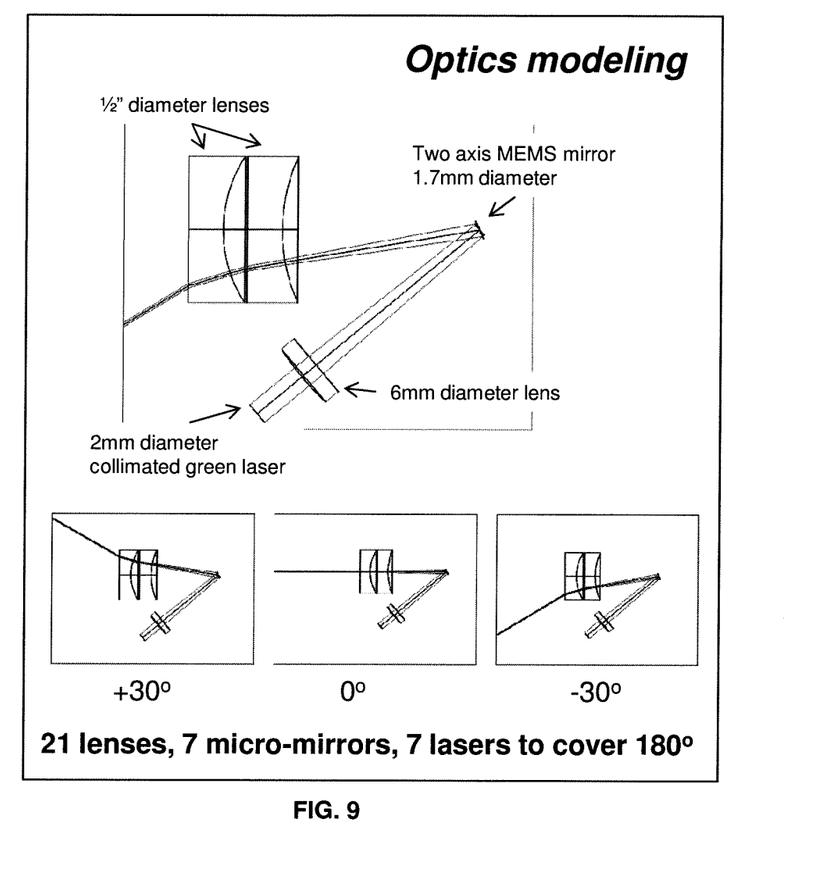

FIG. 9 illustrates an embodiment of a system covering the hemisphere as shown in FIG. 5 using 7 individual systems. Each individual system in this configuration applies 1 2 mm diameter collimated green laser, one two-axis MEMS mirror with a 1.7 mm diameter and 3 lenses. A complete system thus requires 21 lenses, 7 micro-mirrors and 7 lasers. This embodiment allows better tolerances than the system illustrated in FIG. 8 at roughly the same number of components and cost.

Figure 10:
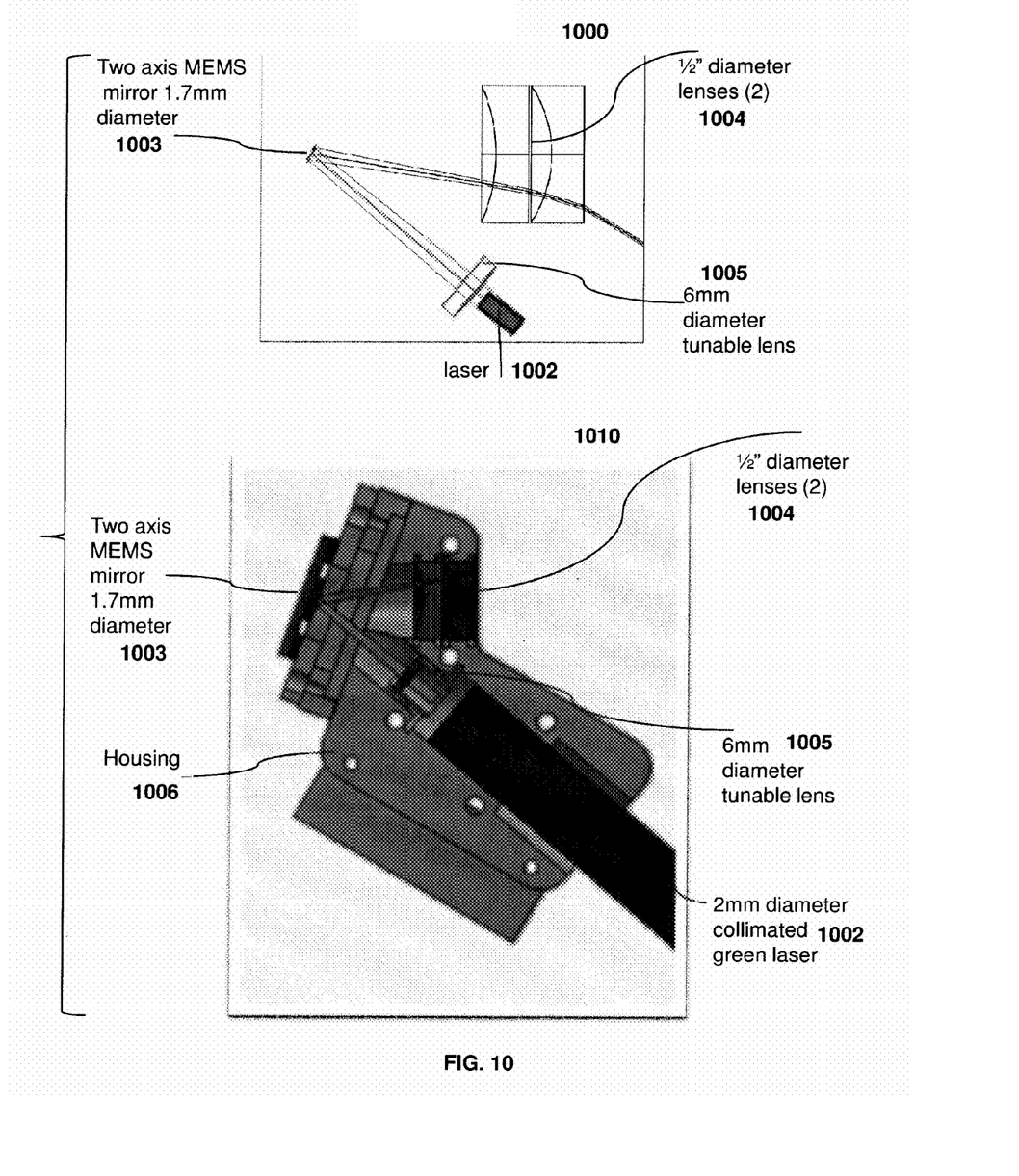
FIGS. 10-12 illustrate embodiments of an illumination unit in accordance with various aspects of the present invention.

FIG. 10 shows an optical model of a system unit 1000 for the system of FIG. 9 with a laser 1002, a tunable lens 1005, a two axis micro-mirror 1003 and a set of two lenses 1004 and an engineering cross-sectional drawing 1010 with the same components in a housing 1006.

Figure 11:
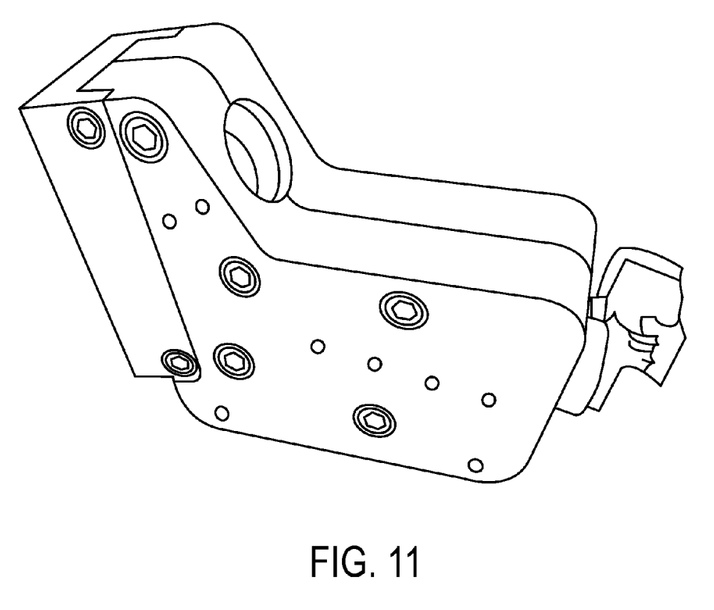
Figure 12:
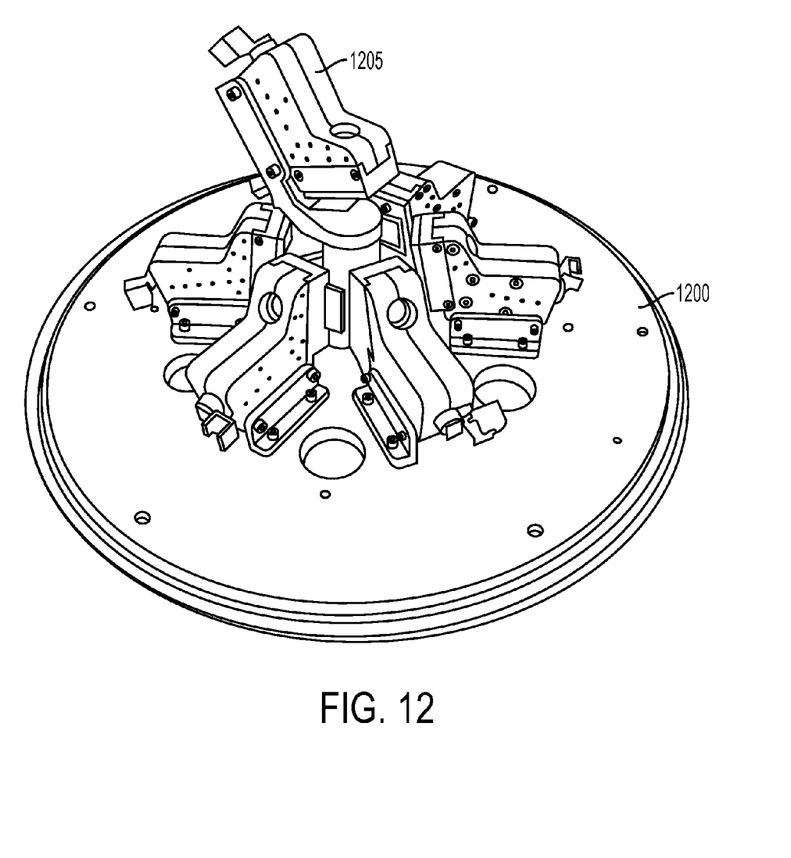

FIG. 11 shows a single illumination unit provided in accordance with an aspect of the present invention in a housing. FIG. 12 shows 7 illumination units provided in accordance with an aspect of the present invention fixed on a base plate 1200 which is part of an integrated system housing. FIG. 12 thus illustrates an integrated illumination system enabled to substantially illuminate a hemisphere. The unit identified as 1205 will illuminate the top of the hemisphere.

The units on a base plate are in one embodiment of the present invention placed in a can or container with windows and preferably a cooling unit such as a thermo-electrical cooling unit to keep the illumination units on a constant temperature. The windows allow the illumination units to substantially illuminate the required volume, only limited by the frame of the windows.

Each laser based illumination unit, as illustrated in FIG. 11 and integrated in the illumination system illustrated in FIG. 12 has at least one processor controlled micro-mirror and is enabled illuminate with an illumination pattern, uniformly, a space or a volume characterized by a segment of a sphere with a differential illumination angle (between its highest and lowest inclination or altitude) in the center of the sphere of preferable 45 degrees in altitude or inclination, more preferably of greater than 45 degrees and most preferably with a top angle or 60 degrees or more.

In accordance with an aspect of the present invention the differential illumination angle of a single laser unit with at least one micro-mirror in the azimuth plane is preferably at least 45 degrees, more preferably more than 45 degrees and most preferably at least 60 degrees. In the most preferable case with each unit illuminating at least 60 degrees in inclination and azimuth, the 7 units placed in correct position relative to each other will illuminate completely or substantially a hemisphere around an integrated illumination unit.

Figure 13:
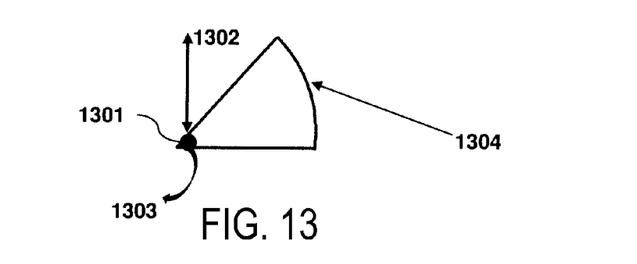
FIGS. 13-15 illustrate an illumination pattern in accordance with an aspect of the present invention.
Figure 14:
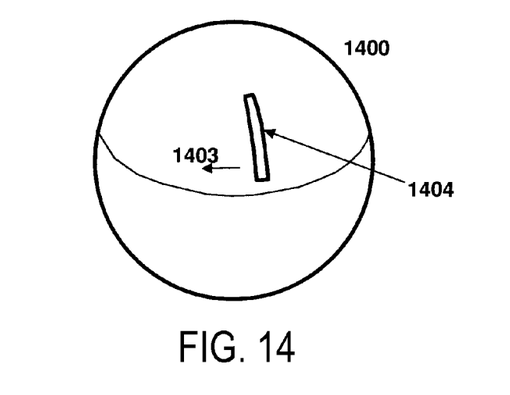

FIG. 13 further illustrates the working of a unit as illustrated in FIG. 11. Element 1301 represents a processor controlled micro-mirror which can move along two axes or rotate or pivot about at least two axes so a laser beam illuminating mirror 1301 appears to move along directions 1302 and 1303 in space. The beam in space then passes arc 1304 and rotates around 1301 in direction 1303. By constantly rewriting the arc rapidly while the mirror has a relatively slow average speed in the direction of 1303, it appears that a written pattern 1404 is moving at a relatively slow speed along a sphere 1400 in a direction 1403. The length of the pattern or bar 1404 is determined by the arc 1304.

In one embodiment of the present invention, the pattern 1404 appears to be a band of laser light with a preferable angular speed equivalent to one complete rotation of 360 degrees in 10 seconds or less, or with a more preferable angular speed equivalent to at least one complete rotation of 360 degrees in 6 seconds or less, or with a most preferable angular speed equivalent to at least one complete rotation of 360 degrees in 4 seconds or less.

Figure 15:
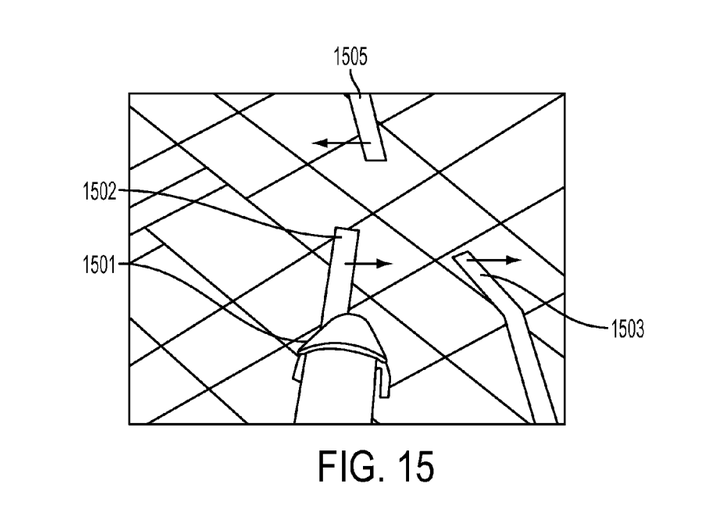

The actual working of the integrated system of FIG. 12 and illustrated in FIGS. 13 and 14 is illustrated in FIG. 15. The system is identified as 1501 and generates for instance illumination patterns 1502, 1503 and 1505. The pattern in this case appears as a bar of light which moves relatively slowly in the direction of the arrows. Light bar 1505 is generated by unit 1205 in FIG. 12. When the light bar reaches the limit of the rotation of the mirror the mirror is directed to its starting position and the pattern re-starts at its corresponding segment. The unit 1501 thus uniformly illuminates a space which is at least part of a sphere.

The methods as provided herein are, in one embodiment of the present invention, implemented on a system or a computer device. A system illustrated in FIG. 16 and as provided herein in accordance with an aspect of the present invention is enabled for receiving, processing and generating data. The system is provided with data that can be stored on a memory 1801. Data may be preprogrammed or provided from any other data relevant source. Data may be provided on an input 1806. The processor is also provided or programmed with an instruction set or program executing the methods of the present invention that is stored on a memory 1802 and is provided to the processor 1803, which executes the instructions of 1802 to process the data from 1801. Data can be outputted on an output device 1804, which may be a computer display. The output device 1804 in one embodiment of the present invention is a projection laser with one or more micro-minors as provided in accordance with one or more of the methods provided as an aspect of the present invention. The processor also has a communication channel 1807 to receive external data from a communication device and to transmit data to an external device. The system in one embodiment of the present invention has an input device 1805, which may include a keyboard, a mouse, a pointing device, or any other device that can generate signals that represent data to be provided to processor 1803.

Figure 16:
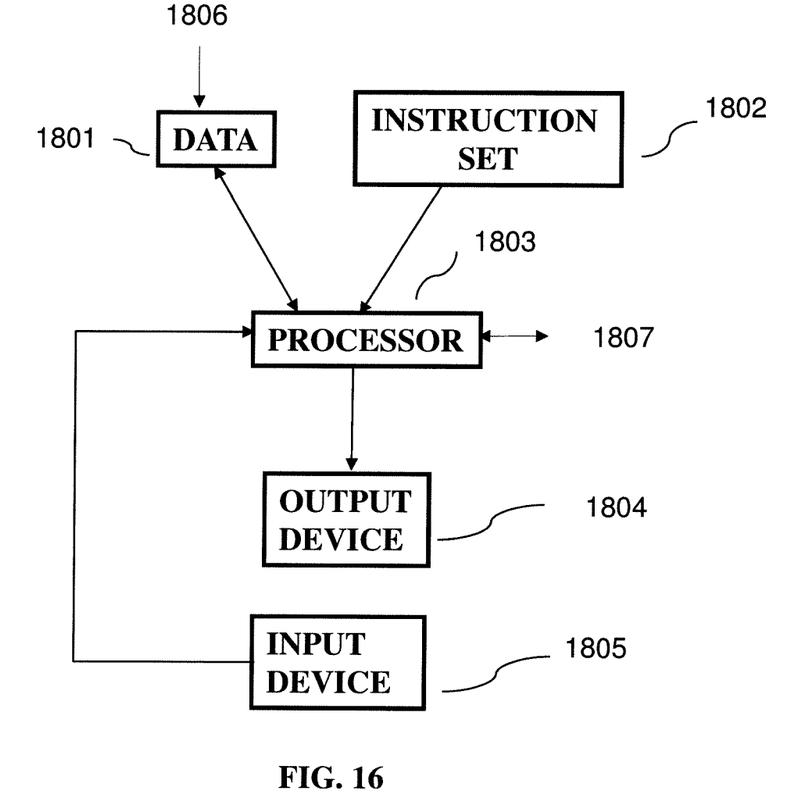
FIG. 16 illustrates a system enabled to perform the steps of the one or more methods provided in accordance with various aspects of the present invention.

The processor can be dedicated hardware. However, the processor can also be a CPU or any other computing device that can execute the instructions of 1802. Accordingly, the system as illustrated in FIG. 16 provides a system for controlling a laser with one or more micro-mirrors to illuminate an area to dissuade animals and is enabled to execute the steps of the methods as provided herein as an aspect of the present invention.

Instructions stored in a memory in or accessible by the processor control the systems as provided herein. The instructions interact and control the electronics that control the intensity of the laser and the motion of a micro-mirror. The instructions can also perform the tasks of (1) Dictate when the system is operational (for example only when the wind turbine is running); (2) Dictate or select the pattern that is created by the first, smaller micro-mirror; (3) dictate the sweeping pattern of the second and larger micro-mirror; (4) dictate or select the sweeping pattern of a projection unit containing one laser and one micro-mirror; (5) control and coordinate multiple projection units that are encased in a single housing; and (6) in cases when there is more than one system, the instructions dictate interactions among the systems, for instance so that the systems take turns pointing up.

Sometimes, animals may get used to laser light if a laser system is providing radiation continuously, lowering the effectiveness of the system. In accordance with an aspect of the present invention an illumination system as provided herein may be switched on and off intermittently. For instance based on pre-set times, or based on a detected presence of animals. In accordance with an aspect of the present invention, two or more illumination systems as provided herein and located at different spots in an illumination region are applied. In accordance with an aspect of the present invention and to further dissuade animals these two or more systems are switched on at different moments to generate their respective illuminating patterns.

Accordingly, a system has been provided in accordance with an aspect of the present invention that enables the execution of instructions by a processor to perform all the steps of methods provided herein. The system can be applied at wind turbines, but also at other objects such as cell tower phones, landing strips, solar farms, transmission lines and transmission towers and at fish farms or at any place where the system would dissuade an animal of approaching an object, including at airports where the object is for instance an aircraft.

The systems as provided herein with one or more aspects of the present invention dissuade an animal to change course from a path towards an area or a region that is covered by such systems. The area or region may contain an object, such a wind turbine. The area or region may also not contain an object. For instance, one may want to prevent an area from being occupied by birds, wherein the area may at some moments contain an airplane. However, it is preferred to have no birds in such an area even if no airplane is present at a certain moment.

It should be clear that the laser beam that originates from the laser and that is reflected by a single micro-mirror or by at least two micro-mirrors will illuminate a volume or a space defined by the movement and angles and position of the mirror(s). It should also be clear that the laser beam sweeps through the space and covers over time, over a complete sweep and/or a complete dazzle pattern the defined space. The term illuminate is used herein to indicate that an object in the path of the beam would be illuminated.

It is also noted that a sweep takes a certain time to complete. The space that is swept by the beam is illuminated over time. The term illuminating the space should be interpreted in that sense.

The sweep pattern causes a resolution of illuminating of the volume to be covered by a laser/mirror system and may be determined by the performance of a single mirror or by a second mirror if a second mirror is applied.

In one embodiment of the present invention, an illumination system applying at least two micro-mirrors illuminates an area perpendicular to the laser beam with a surface of 1 by 1 meter of the illuminated space at a distance of 200 meters and the illuminated area is crossed by a laser beam at least once every 5 seconds. In one embodiment of the present invention a system applying at least two micro-mirrors illuminates an area perpendicular to the laser beam with a surface of 1 by 1 meter of the illuminated space at a distance of 200 meters wherein the illuminated area is crossed by a laser beam at least once every second. In one embodiment of the present invention a system applying at least two micro-mirrors illuminates an area perpendicular to the laser beam with a surface of 10 by 10 centimeter of the illuminated space at a distance of 200 meters wherein the illuminated area is crossed by a laser beam at least once every 5 seconds. In one embodiment of the present invention, a system applying at least two micro-mirrors illuminates an area perpendicular to the illumination beam with a surface of 10 by 10 centimeters of the illuminated space at a distance of 200 meters wherein the illuminated area is crossed by a laser beam at least once every second.

In one embodiment of the present invention, the space illuminated by the laser system using one or more micro-mirror is defined by at least a part of a sphere with a radius of 50 meters or less. In one embodiment of the present invention the space illuminated by the laser system using one or more micro-mirror is defined by at least a part of a sphere with a radius of 100 meters or less. In one embodiment of the present invention the space illuminated by the laser system is defined by at least a part of a sphere with a radius of 200 meters or less. In one embodiment of the present invention the space illuminated by the laser system is defined by at least a part of a sphere with a radius of 50 meters or more. In one embodiment of the present invention the space illuminated by the laser system is defined by at least a part of a sphere with a radius of 100 meters or more.

In one embodiment of the present invention, the space illuminated by the laser system using one or more micro-mirror is defined by at least a part of a sphere with a radius of 1 kilometer or more.

In one embodiment of the present invention, an area perpendicular to the illumination beam with a surface of 1 by 1 meter of in an illuminated space being a part of a sphere defined by a differential azimuth of at least 45 degrees and a differential inclination of at least 45 degrees at a distance of 100 meters is crossed by a laser beam at least once every second. In one embodiment of the present invention, an area perpendicular to the illumination beam with a surface of 1 by 1 meter in an illuminated space being a part of a sphere defined by a differential azimuth of at least 45 degrees and a differential inclination of at least 45 degrees at a distance of 200 meters is crossed by a laser beam at least once every second. In one embodiment of the present invention, an area perpendicular to the illumination beam with a surface of 10 by 10 centimeter in an illuminated space being a part of a sphere defined by a differential azimuth of at least 45 degrees and a differential inclination of at least 45 degrees at a distance of 200 meters is crossed by a laser beam at least once every 5 seconds. In one embodiment of the present invention, an area perpendicular to the illumination beam with a surface of 10 by 10 centimeters in an illuminated space being a part of a sphere defined by a differential azimuth of at least 45 degrees and a differential inclination of at least 45 degrees at a distance of 200 meters is crossed by a laser beam at least once every second.

A differential azimuth herein is defined as the azimuth range of a laser beam from the center of a sphere determined in a plane through the center of the sphere at an inclination of 0 degrees, wherein 0 degrees inclination is defined by the plane through the center and the surface of the ground. Differential inclination is defined herein as the inclination range of the laser beam between its lowest inclination and its highest inclination. A 60 degrees differential azimuth and a 60 degrees differential inclination is illustrated in FIG. 5. In FIG. 5 the lowest inclination is 0 degrees and the highest is 60 degrees. In different conditions one may set a lowest inclination of the laser beam at 20 degrees and a highest at 80 degrees relative to the 0 degrees plane, still creating a 60 degrees differential inclination.

The illumination of a covered space thus takes place over a certain (sweep) time and with a certain resolution, the resolution being defined by the distance to the system.

One can increase probabilities of illumination by increasing the speed of the micro-mirror or by decreasing the illuminated total space, for instance.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims.

The invention claimed is:

1. A method for dissuading a moving animal inside a volume from approaching an object in an area inside the volume, comprising:
   a laser located in the area generating a light pattern which sweeps and illuminates a section of the volume around the area, the volume having a radius of at least 100 meters;
   wherein the laser illuminates a first micro-mirror moveable about two axes controlled by a processor to generate the light pattern of laser light to form a bar of laser light, wherein the laser light illuminates the moving animal inside the volume at a distance of at least 100 meters from the laser with a predefined probability.

2. The method of claim 1, wherein the laser is part of a system of a plurality of lasers which concurrently illuminate different parts of the perimeter of the volume with at least the predefined probability.

3. The method of claim 1, further comprising:
   the pattern of laser light illuminating a second micro-mirror controlled by the processor to generate a second pattern of laser light.

4. The method of claim 1, wherein the laser is a green light laser.

5. The method of claim 1, wherein the animal is a bird.

6. The method of claim 1, wherein the animal is a bat.

7. The method of claim 1, wherein the area contains a wind turbine.

8. The method of claim 1, further comprising:
   illuminating the volume through a lens.

9. The method of claim 1, wherein an object with a cross-section perpendicular to a laser beam of at least 10 cm by 10 cm has a probability to be illuminated by the laser beam once every one second that is better than 90% at a distance of 200 meters of the laser.

10. The method of claim 1, wherein the volume is determined by a part of a sphere with a center located at a housing containing the laser and a differential azimuth angle of at least 45 degrees and a differential inclination angle of at least 45 degrees.

11. A system to dissuade a moving animal inside a space from approaching an object in a region inside the space, comprising:

a laser located in the region to generate a light pattern which sweeps and illuminates a section of the volume around the region, the volume having a radius of at least 100 meters;

a processor to control a movement of a first micro-mirror pivotable about a first and a second axis to generate the light pattern that forms a bar of laser light, wherein the laser light illuminates the moving animal inside the volume at a distance of at least 100 meters from the laser with a predefined probability.

12. The system of claim 11, further comprising:
at least six additional lasers, each additional laser illuminating a corresponding micro-mirror, all lasers and micro-mirrors integrated in a single housing and enabled to substantially illuminate a hemisphere around the system.

13. The system of claim 11, further comprising:
a second micro-mirror, movable about two axes and controlled by the processor and enabled to receive and to reflect the laser beam from the first micro-mirror to generate a second pattern.

14. The system of claim 11, wherein the laser generates light in a wavelength range of 500 nm to 550 nm.

15. The system of claim 11, wherein the animal is a bird.

16. The system of claim 11, wherein the animal is a bat.

17. The system of claim 11, wherein the region contains a wind turbine.

18. The system of claim 11, wherein the region contains is a transmission tower.

19. The system of claim 11, wherein the laser is located at an airport.

* * * * *